(12) United States Patent
Kaito et al.

(10) Patent No.: US 10,193,177 B2
(45) Date of Patent: *Jan. 29, 2019

(54) FUEL CELL SYSTEM AND OPERATING METHOD THEREFOR

(71) Applicant: NISSAN MOTOR CO., LTD., Yokohama-shi, Kanagawa (JP)

(72) Inventors: Takahiro Kaito, Yokosuka (JP); Keigo Ikezoe, Ayase (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 804 days.

This patent is subject to a terminal disclaimer.

(21) Appl. No.: 14/299,428

(22) Filed: Jun. 9, 2014

(65) Prior Publication Data

US 2014/0335430 A1 Nov. 13, 2014

Related U.S. Application Data

(63) Continuation of application No. 12/530,079, filed as application No. PCT/IB2008/001584 on Jun. 18, 2008, now Pat. No. 8,790,836.

(30) Foreign Application Priority Data

Jun. 20, 2007 (JP) .............. 2007-162905
Jun. 20, 2007 (JP) .............. 2007-162906
Feb. 22, 2008 (JP) .............. 2008-041835

(51) Int. Cl.
*H01M 8/04228* (2016.01)
*H01M 8/04303* (2016.01)
(Continued)

(52) U.S. Cl.
CPC .............. *H01M 8/10* (2013.01); *H01M 8/04* (2013.01); *H01M 8/0432* (2013.01);
(Continued)

(58) Field of Classification Search
CPC ....... H01M 8/04291; H01M 8/04492–8/04529
(Continued)

(56) References Cited

U.S. PATENT DOCUMENTS

| 2005/0287416 A1 | 12/2005 | Ikezoe |
| 2007/0026276 A1 | 2/2007 | Ogawa |
| 2007/0196709 A1* | 8/2007 | Umayahara ....... H01M 8/04164 429/410 |

FOREIGN PATENT DOCUMENTS

| JP | 2005-285610 | 10/2005 |
| JP | 2006-100093 | 4/2006 |

(Continued)

*Primary Examiner* — Barbara L Gilliam
*Assistant Examiner* — Helen M McDermott
(74) *Attorney, Agent, or Firm* — Drinker Biddle & Reath LLP

(57) ABSTRACT

A fuel cell system and method that enables warm-up power generation corresponding to the residual water volume in the fuel cell stack without using auxiliary devices for measuring the residual water volume in the fuel cell stack. A controller computes total generated electrical energy Q by integrating of the generated current detected by current sensor during the period from start-up to shutting down of the fuel cell system, and stores the result in total generated electrical energy storage part. Also, controller measures fuel cell temperature Ts at the last shutting down cycle with temperature sensor, and stores it in power generation shutting down temperature storage part. When the fuel cell system is started, controller estimates residual water volume WR that remains in fuel cell stack 2 on the basis of fuel cell temperature Ts when power generation is shut down, total generated electrical energy Q, and fuel cell start-up temperature Tn, and sets the generated electrical power for warm-up at start-up on the basis of said residual water volume Wr.

4 Claims, 16 Drawing Sheets

(51) Int. Cl.
 H01M 8/04291 (2016.01)
 H01M 8/04492 (2016.01)
 H01M 8/04537 (2016.01)
 H01M 8/04828 (2016.01)
 H01M 8/10 (2016.01)
 H01M 8/04223 (2016.01)
 H01M 8/06 (2016.01)
 H01M 8/04 (2016.01)
 H01M 8/04858 (2016.01)
 H01M 8/04119 (2016.01)
 H01M 8/0432 (2016.01)
 H01M 8/04701 (2016.01)
 H01M 8/04746 (2016.01)
 H01M 8/1018 (2016.01)

(52) U.S. Cl.
 CPC ... *H01M 8/04179* (2013.01); *H01M 8/04228* (2016.02); *H01M 8/04231* (2013.01); *H01M 8/04253* (2013.01); *H01M 8/04291* (2013.01); *H01M 8/04303* (2016.02); *H01M 8/04492* (2013.01); *H01M 8/04529* (2013.01); *H01M 8/04589* (2013.01); *H01M 8/04619* (2013.01); *H01M 8/04701* (2013.01); *H01M 8/04753* (2013.01); *H01M 8/04768* (2013.01); *H01M 8/04828* (2013.01); *H01M 8/04925* (2013.01); *H01M 8/06* (2013.01); *H01M 2008/1095* (2013.01); *H01M 2250/20* (2013.01); *Y02E 60/50* (2013.01); *Y02E 60/521* (2013.01); *Y02T 90/32* (2013.01)

(58) Field of Classification Search
 USPC .......................................................... 429/429
 See application file for complete search history.

(56) References Cited

FOREIGN PATENT DOCUMENTS

| | | |
|---|---|---|
| JP | 2006-351280 | 12/2006 |
| JP | 2007-35389 | 2/2007 |
| JP | 2007-207716 | 8/2007 |
| JP | 2007-207724 | 8/2007 |
| JP | 2007-317552 | 12/2007 |
| WO | WO 2005/053070 | 6/2005 |
| WO | WO 2007/091137 | 8/2007 |

\* cited by examiner

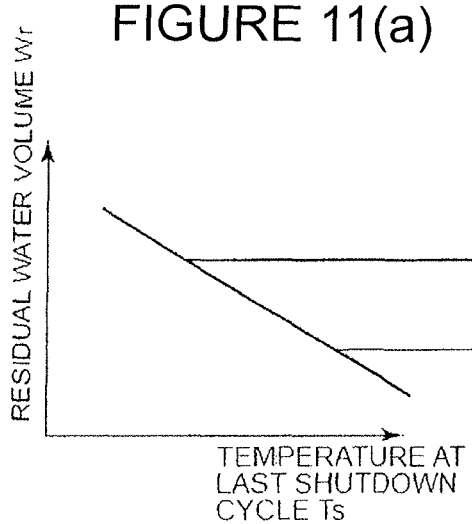
FIGURE 11(a)
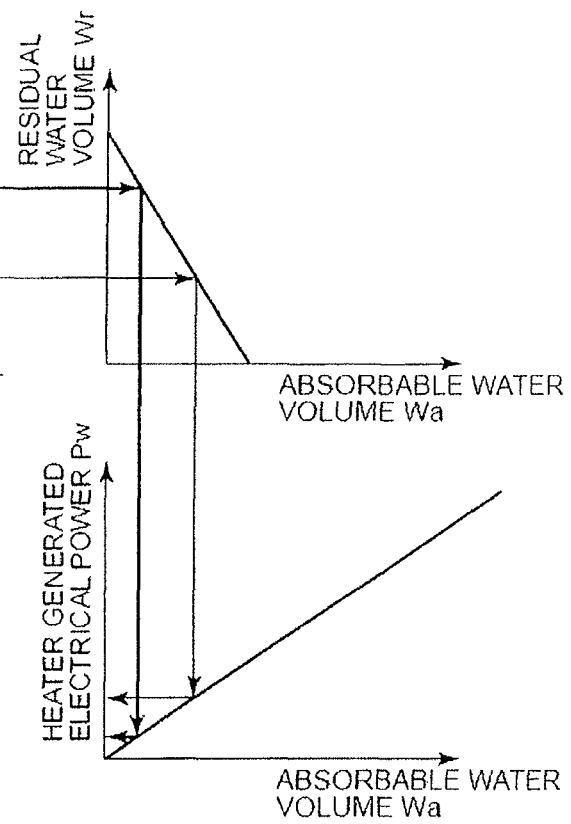
FIGURE 11(b)
FIGURE 11(c)

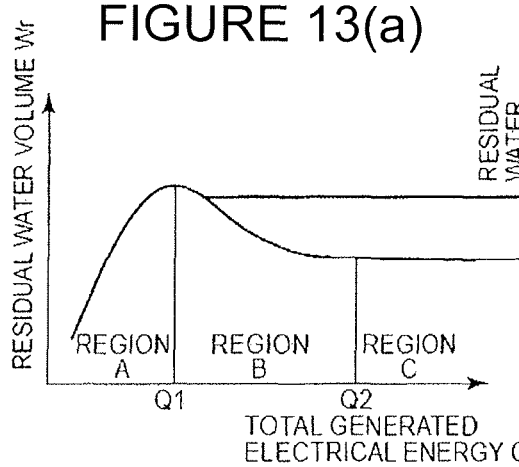
FIGURE 13(a)
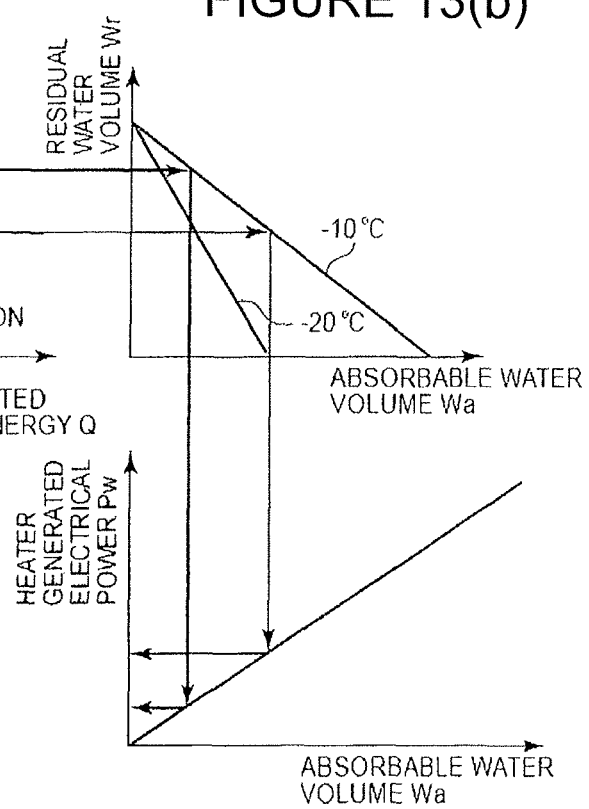
FIGURE 13(b)
FIGURE 13(c)

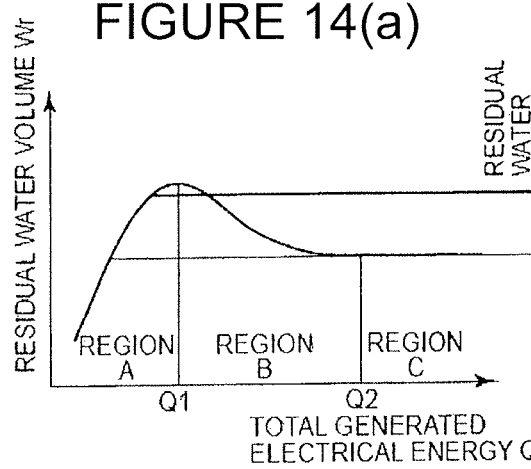
FIGURE 14(a)
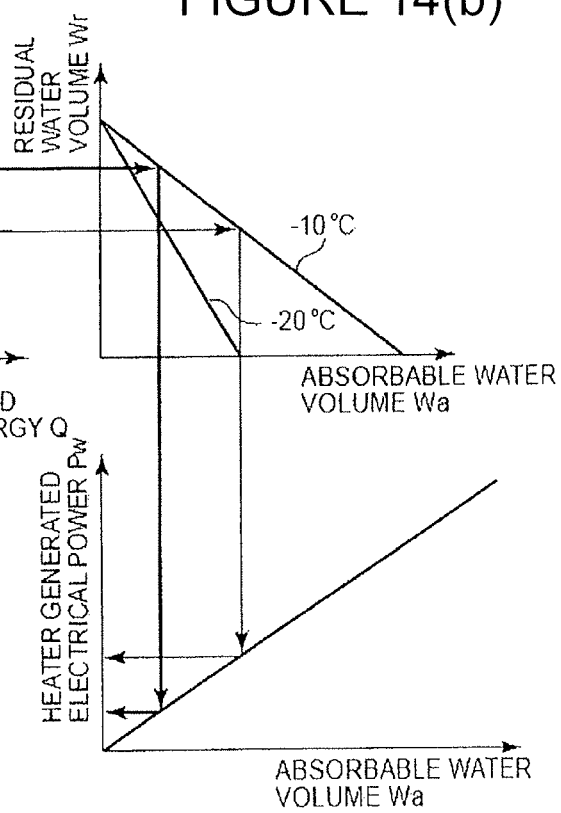
FIGURE 14(b)
FIGURE 14(c)

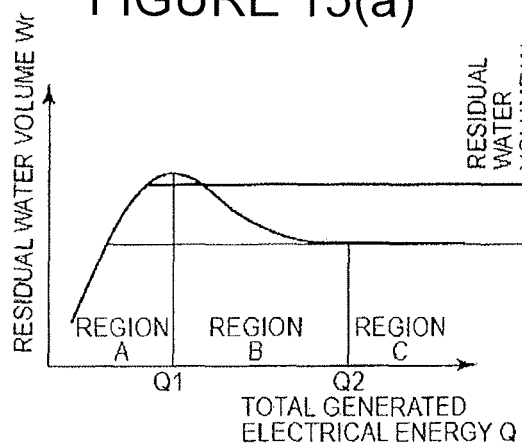
FIGURE 15(a)
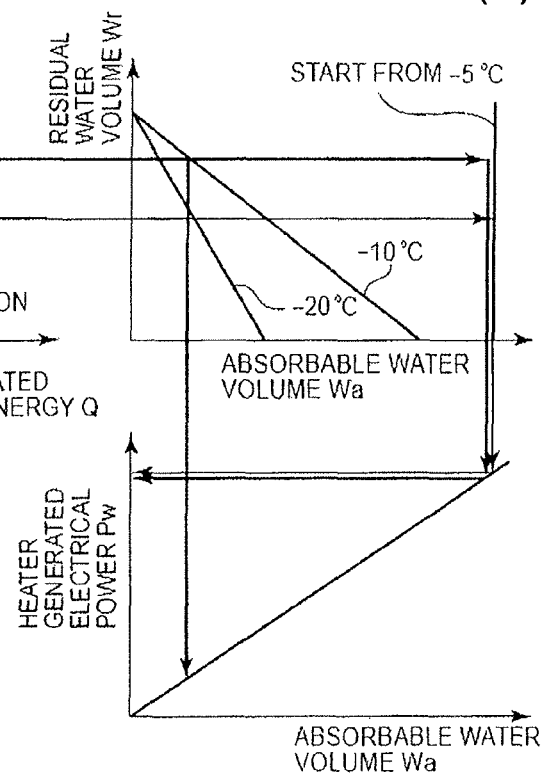
FIGURE 15(b)
FIGURE 15(c)

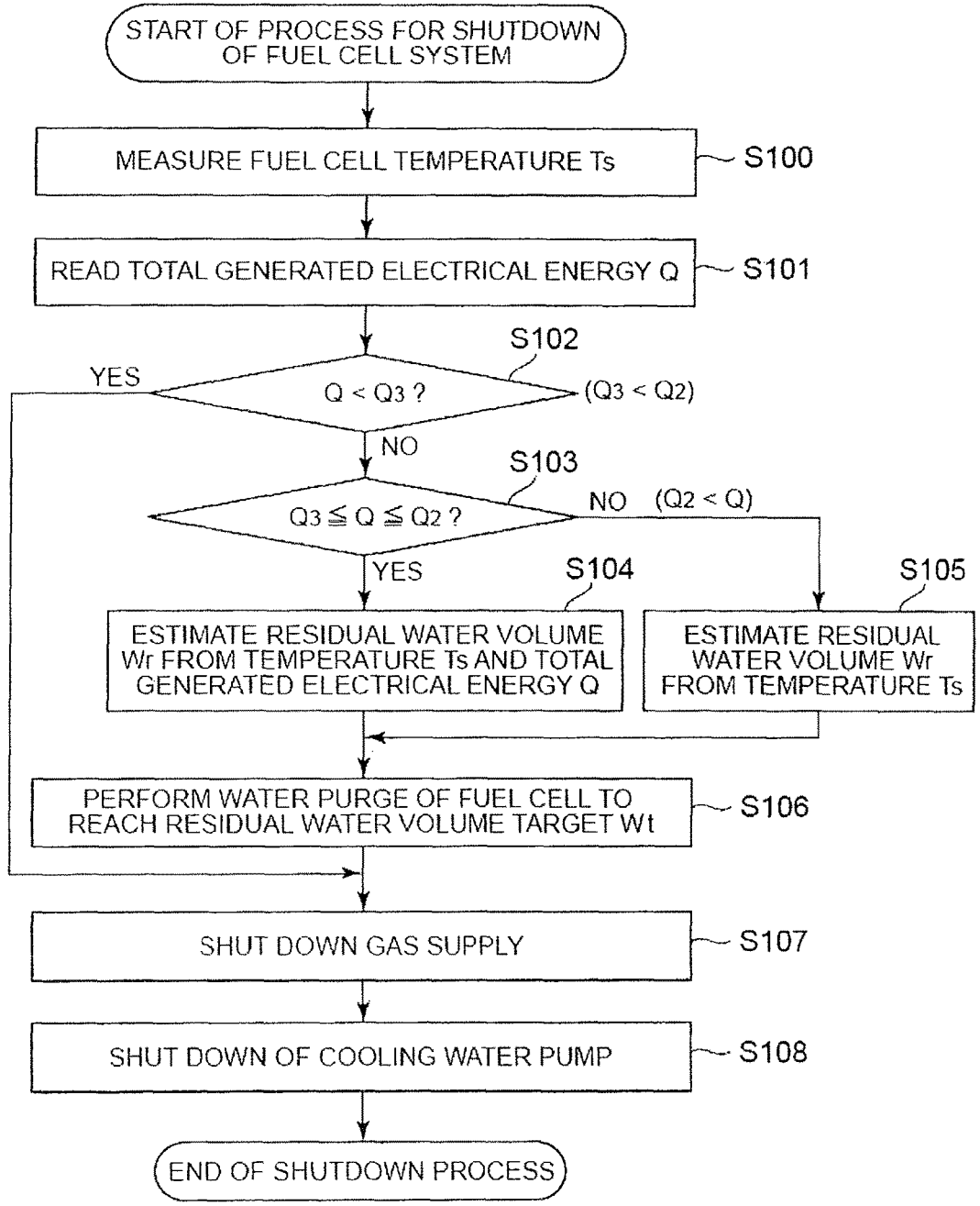

000# FUEL CELL SYSTEM AND OPERATING METHOD THEREFOR

CROSS-REFERENCE TO RELATED APPLICATIONS

This is a continuation application of copending application Ser. No. 12/530,079, having a § 371 date of Dec. 18, 2009, which is a national stage filing based on PCT International Application No. PCT/IB2008/001584, filed on Jun. 18, 2008. The copending application Ser. No. 12/530,079 is incorporated by reference herein in its entirety.

This application claims priority to Japanese Patent Application No. 2007-162905, filed Jun. 20, 2007, Japanese Patent Application No. 2007-162906, filed Jun. 20, 2007 and Japanese Patent Application No. 2007-041835, filed Feb. 22, 2008, the entire contents of which being incorporated by reference herein.

BACKGROUND OF THE INVENTION

1. Field of the Invention

The present invention generally relates to a fuel cell system and its method of operation.

2. Description of the Related Art

Typically, for a solid-state polymer type fuel cell, the optimum temperature for power generation is in the range of 70-90° C. When the fuel cell is started at sub-freezing temperatures, the water in the fuel cell stack is frozen, so that the reaction gases generally cannot be well fed to the catalyst layer, and the catalyst component of the electrodes cannot promote the electrochemical reaction, thus leading to deteriorated performance. In order to avoid this problem, the following method has been proposed as described in Japanese Kokai Patent Application No. 2006-100093. In that method, the residual water volume in the fuel cell stack is computed, and on the basis of the residual water volume and the internal temperature of the fuel cell stack, the maximum current that can flow through the fuel cell stack is computed, and the start-up current is restricted to the maximum current that can flow.

Also in that method, the residual water volume is determined from the volume of water purged from the interior of the fuel cell stack during the last shutdown cycle, the change in weight of the fuel cell stack, the fuel cell stack resistance, the fuel cell stack final load, and so on. However, when the residual water volume estimation device is carried onboard the vehicle, the device can occupy an undesired amount of space on the vehicle, which can be problematic.

SUMMARY OF THE INVENTION

The embodiments of the present invention described herein can address the above problems by providing a fuel cell system that comprises a temperature measurement device that measures the temperature of the fuel cell stack, and a residual water volume estimation device that estimates the residual water volume left in the fuel cell stack on the basis of the temperature when the power generation is shut down.

Also, the embodiments of the present invention provide a method of operating the fuel cell system that includes a step in which the temperature of the fuel cell stack when the power generation is shut down is measured, and a step in which said fuel cell stack generates electrical power on the basis of said temperature when the fuel cell system is started.

In addition, the embodiments of the present invention provide a method of operation of a fuel cell system that includes a step in which the temperature of the fuel cell stack when the power generation is shut down is measured, and a step in which the residual water in the fuel cell is purged on the basis of said temperature when the fuel cell system is shut down.

Hence, according to the embodiments of the present invention, it is possible to estimate the residual water volume by using a simple constitution. Consequently, it is possible to estimate the residual water volume without causing the deterioration of the volumetric efficiency.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIG. 11(a)-(c) are diagrams illustrating an example of the process of determination of generated electrical power for warm-up Pw from fuel cell temperature Ts at the last shutting down cycle in the first embodiment;

FIGS. 13(a)-(c) are diagrams illustrating an example of the process of determining generated electrical power for warm-up Pw from total generated electrical energy Q in the third embodiment;

FIGS. 14(a)-(c) are diagrams illustrating an example of the process of determining generated electrical power for warm-up Pw from total generated electrical energy Q in the third embodiment;

FIGS. 15(a)-(c) are diagrams illustrating an example of the process of determining generated electrical power for warm-up Pw from total generated electrical energy Q in the third embodiment;

FIG. 18 is a flow chart illustrating an example of the process for shutting down the fuel cell system in the modified example.

DESCRIPTION OF THE PREFERRED EMBODIMENTS

In the following, an explanation will be given in more detail regarding an embodiment of the present invention with reference to the figures. In the embodiments to be presented below, the fuel cell system is preferably for use in a fuel cell vehicle that requires start-up at sub-freezing temperatures (hereinafter to be referred to as start-up below 0° C.), although the present invention is not restricted to this type of environment.

Figure 1:
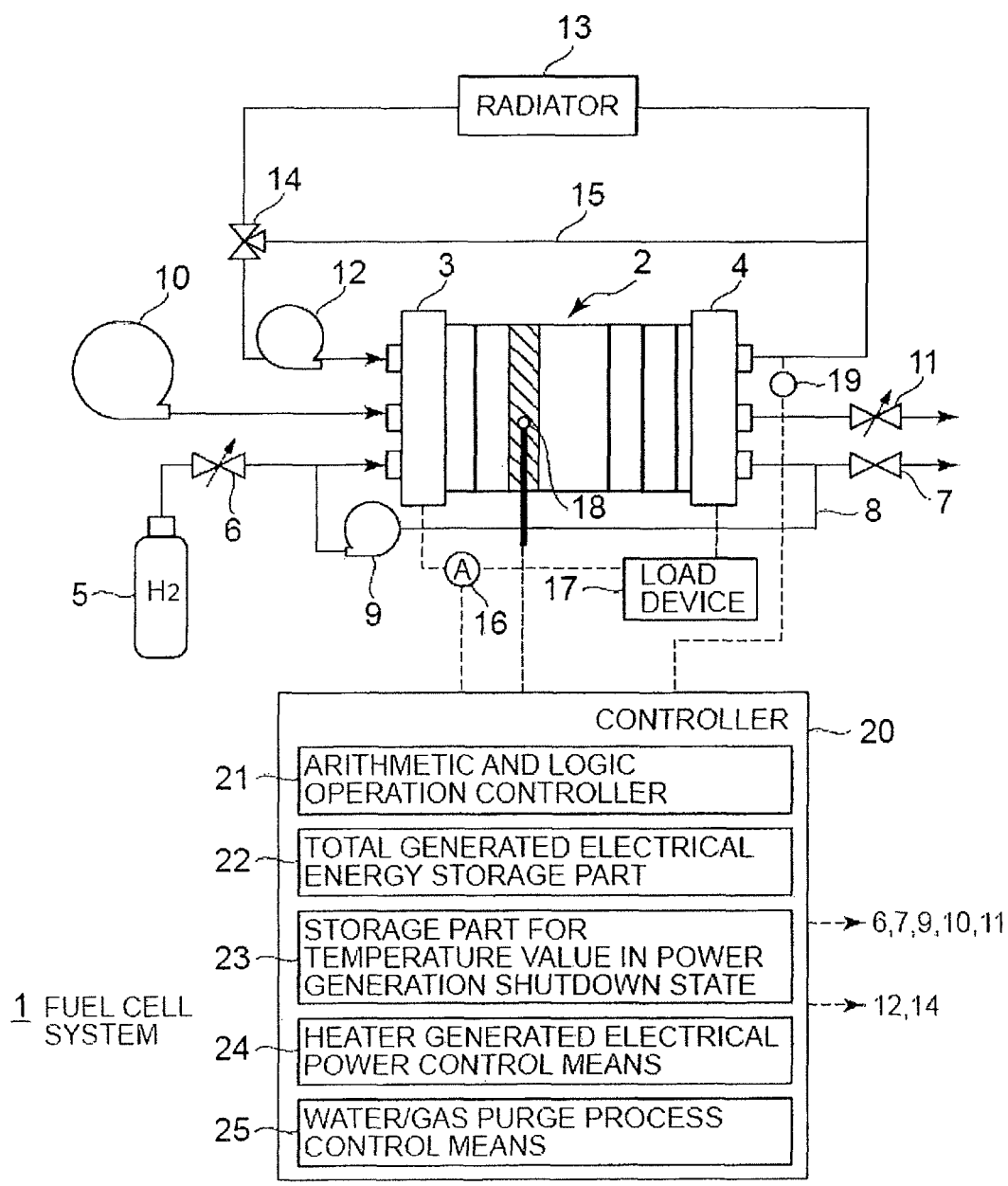
FIG. 1 is a system constitution diagram illustrating an example of the fuel cell system in accordance with an embodiment of the present invention.

FIG. 1 is a diagram illustrating the constitution of the system shared by the various embodiments of the fuel cell system of the present invention. As shown in FIG. 1, fuel cell system 1 includes solid-state polymer type fuel cell stack 2. In this example, the fuel cell stack 2 has anode 3, to which the fuel gas is fed (fuel electrode, negative electrode) and cathode 4, to which the oxidant gas is fed (oxidant electrode, positive electrode).

Hydrogen as the fuel gas is stored in hydrogen tank 5, and it is fed via hydrogen pressure adjustment valve 6 to anode 3. The anode off-gas containing unreacted hydrogen gas exhausted from the outlet of anode 3 is fed back via fuel circulation path 8 and fuel circulation pump 9 to the inlet of anode 3. Purge valve 7 is opened when the anode off-gas, which contains nitrogen gas, water and other impurities, is exhausted from the system; it is usually closed.

Air compressor 10 feeds air as the oxidant gas to cathode 4. Air pressure adjustment valve 11 adjusts the pressure of cathode 4. Inside fuel cell stack 2 is a coolant path (not shown in the figure) and coolant pump 12 arranged between radiator 13 and fuel cell stack 2 for circulating coolant. Also, there is coolant bypass line 15 that bypasses radiator 13 during the generation of power for warm-up, and there is 3-way valve 14 for selecting radiator 13 or coolant bypass line 15.

The anode 3 and cathode 4 of fuel cell stack 2 are connected to load device 17 so that the generated electrical power can be fed. In this example, load device 17 is an electrical power converter for feeding the appropriate electrical power to the various auxiliary devices of the fuel cell, such as air compressor 10, coolant pump 12, a heater (not shown in the figure), a motor for driving the vehicle (not shown in the figure), and so on. Current sensor 16 measures the current flowing between anode 3 and load device 17, and it sends the measured value to controller 20 (e.g., control means). Also, there is a temperature sensor 18 (e.g., temperature measurement means) that measures the internal temperature of fuel cell stack 2 as the representative temperature, and temperature sensor 19 that measures the temperature of the coolant at the coolant outlet of fuel cell stack 2. These measured values are sent to controller 20.

The controller 20 controls the entire fuel cell system 1 and, at the same time, it estimates the residual water volume inside the fuel cell stack. Also, there is generated electrical power for warm-up control device 24 that controls the generated electrical power for warm-up of fuel cell stack 2.

Controller 20 has arithmetic and logic operation control part 21, total generated electrical energy storage part 22 (total generated electrical energy storage means) that stores the total electrical energy generated by fuel cell stack 2, and power generation shutting down temperature storage part 23 that stores the temperature of fuel cell stack 2 at the last shutting down cycle. In this example, total generated electrical energy storage part 22 is not needed in the first and second embodiments, but can be used in the third embodiment.

Although not required, controller 20 may be a microprocessor comprising a CPU, a program ROM, an operation RAM, and an input/output interface. The control instructions (to be explained in the various embodiments) are implemented by execution of the control program stored in said program ROM by the CPU. Also, the control map referred to in the various embodiments is stored in the program ROM.

The basic concept common to the various embodiments will be explained below. When the time from start-up to shutting down of the fuel cell or the total generated electrical energy exceeds a prescribed level, the sum of the water volume fed to the fuel cell stack and the generated water volume is in agreement with the water volume purged from the fuel cell stack, and a balanced state is reached. The water volume inside the fuel cell stack is a prescribed volume depending on the fuel cell stack temperature. The water volume purged from the fuel cell increases when the temperature is higher according to the temperature characteristics of the saturated water vapor pressure. Consequently, the higher the temperature of the fuel cell stack, the smaller the residual water volume left inside the fuel cell stack.

When the fuel cell stack having said residual water volume is started at sub-freezing temperatures, most of the generated water is condensed inside the fuel cell stack, and it is absorbed by the electrolyte membrane. However, the water volume that can be absorbed by the electrolyte membrane is limited. When the water volume that can be absorbed exceeds this limit, the generated water seeps out to the catalyst layer, leading to flooding that hinders the gas supply to the catalyst layer. When flooding takes place, the cell voltage falls, and it is necessary to interrupt the power generated for warm-up.

Consequently, the greater the residual water volume, the lower the generated electrical power for warm-up, so that the power for warm-up continues to be generated, and the fuel cell stack can be quickly heated.

First Embodiment

The following explanation will be given regarding the first embodiment of the fuel cell system of the present invention with reference to the flow charts shown in FIGS.

Figure 2:
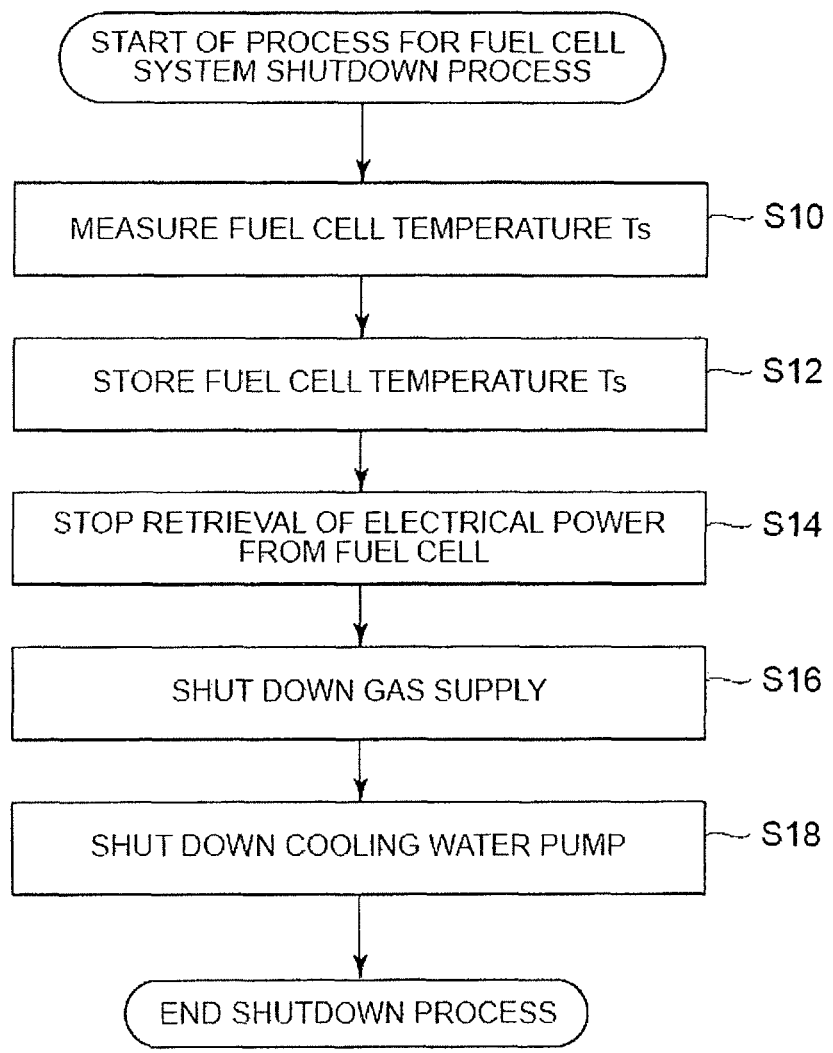
FIG. 2 is a flow chart illustrating an example of the process for shutting down the fuel cell system as described in the first through third embodiments.

2 and 3. FIG. 2 is a flow chart illustrating the process for shutting down the operation of fuel cell system 1. When a request to shut down fuel cell system 1 is received, such as when the on/off key switch for controlling on/off the fuel cell system is turned from on to off, the operation of the process for shutting down the fuel cell system shown in FIG. 2 is started. First, in step S10, controller 20 reads the measurement value of temperature sensor 18, and representative temperature Ts of fuel cell stack 2 when power generation is shut down (hereinafter to be referred to as fuel cell temperature Ts, or simply temperature Ts) is measured. Temperature Ts may be measured using temperature sensor 18 set in fuel cell stack 2 shown in FIG. 1. Also, if no temperature sensor is arranged in fuel cell stack 2, the measurement may be performed by using temperature sensor 19 set at the coolant outlet of fuel cell stack 2.

Then, in step S12, controller 20 stores said fuel cell temperature Ts stored in a nonvolatile memory in controller 20. In step S14, controller 20 stops the retrieval of electrical power from fuel cell stack 2 to load device 17. In step S16, controller 20 closes hydrogen pressure adjustment valve 6. At the same time, the driving of air compressor 10 is stopped, and the supply of gas to fuel cell stack 2 is stopped. Then, in step S18, controller 20 shuts down coolant pump 12, and the process for shutting down the fuel cell system comes to an end.

Figure 3:
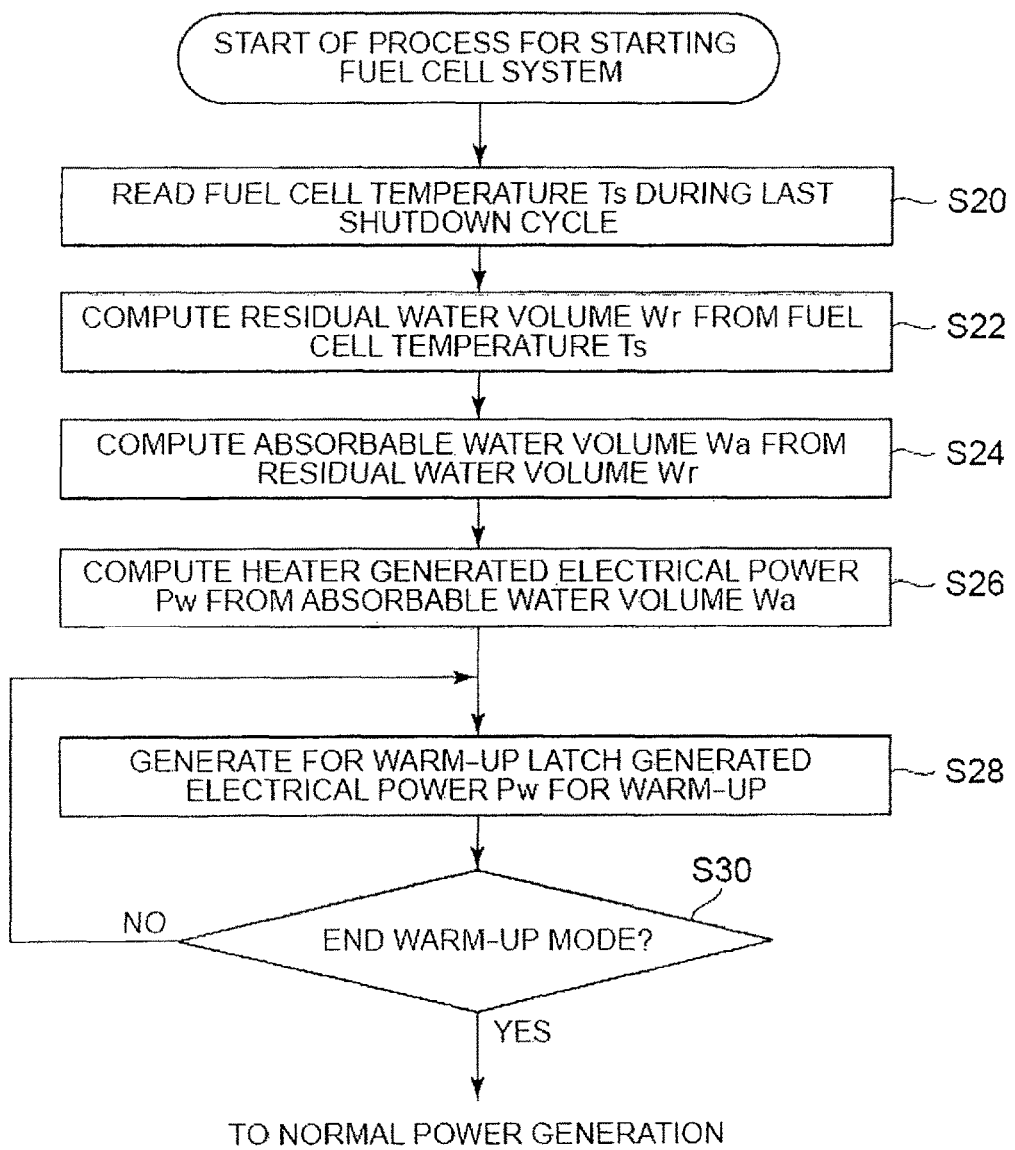
FIG. 3 is a flow chart illustrating an example of the process for starting up the fuel cell system in the first embodiment.
Figure 7:
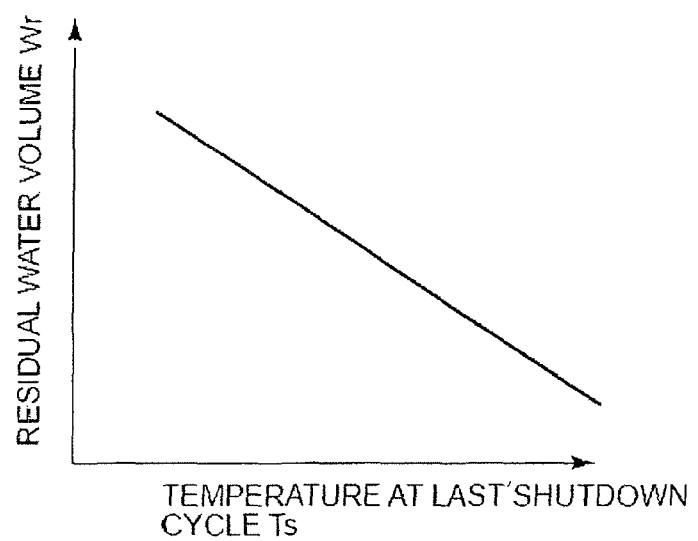
FIG. 7 is a diagram illustrating an example of the control map showing the relationship between fuel cell temperature Ts at the last shutdown cycle and residual water volume Wr in the first and second embodiments.

FIG. 3 is a flow chart illustrating the process for starting fuel cell system 1 in the first embodiment at sub-freezing temperatures. When a request to start fuel cell system 1 is received, such as when the on/off key switch that controls the fuel cell system is switched from off to on, the process for starting the fuel cell system shown in FIG. 3 is started. First, in step S20, controller 20 reads fuel cell temperature Ts at the last shutting down cycle is read from the nonvolatile memory. Then, in step S22, controller 20 computes residual water volume WR that remains in fuel cell stack 2, particularly in membrane/electrode assembly (MEA) from temperature Ts. As shown in FIG. 7, the control map for indicating the relationship between temperature Ts and residual water volume Wr is used in this computation.

Figure 8A:
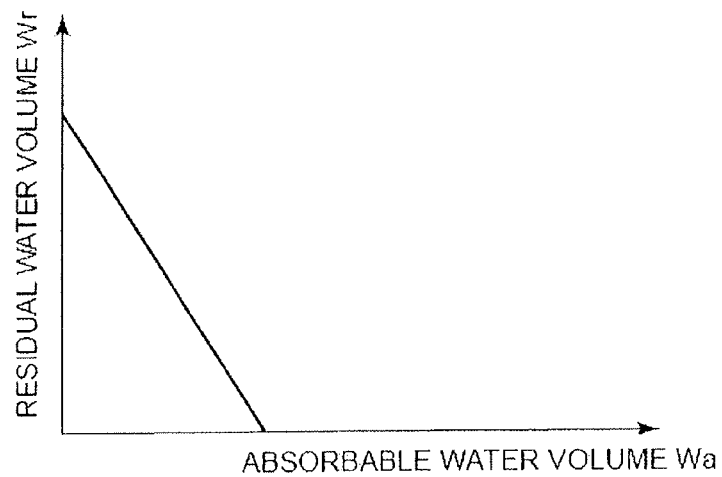
FIG. 8(a) is a diagram illustrating an example of the control map showing the relationship between residual water volume Wr and absorbable water volume Wa in Embodiment 1.
Figure 8B:
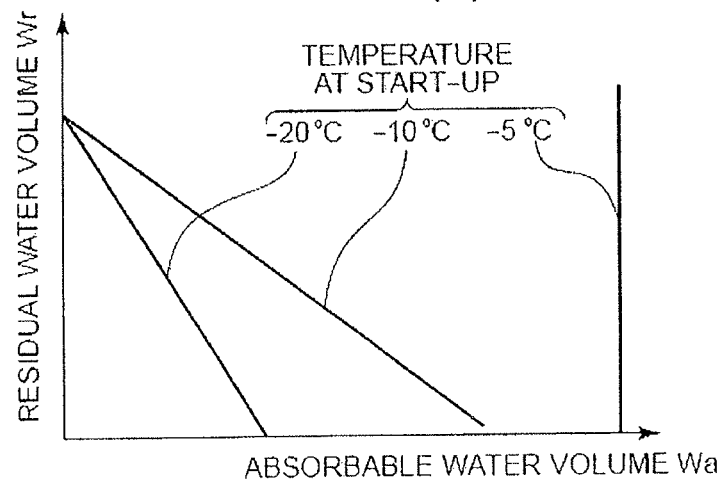
FIG. 8(b) is a diagram illustrating an example of the control map showing the relationship between residual water volume Wr and absorbable water volume Wa in the first and second embodiments.
Figure 9:
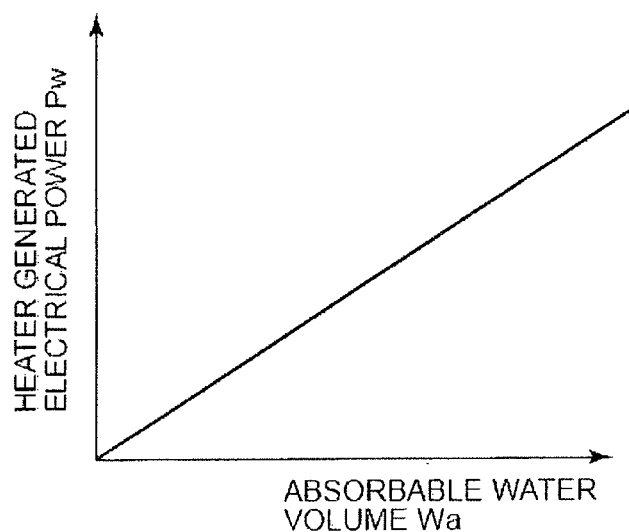
FIG. 9 is a diagram illustrating an example of the control map showing the relationship between absorbable water volume Wa and generated electrical power for warm-up Pw in the first through third embodiments.

In step S24, controller 20 computes water volume Wa that can be absorbed by the MEA from residual water volume Wr by referring to the control map that indicates the relationship between residual water volume Wr and absorbable water volume Wa, as shown in FIGS. 8(a) and 8(b). Then, in step S26, controller 20 refers to the control map that indicates the relationship between said absorbable water volume Wa and generated electrical power for warm-up Pw as shown in FIG. 9 and computes generated electrical power for warm-up Pw from said absorbable water volume Wa. In step S28, controller 20 controls the supply of hydrogen and air that corresponds to generated electrical power for warm-up Pw. At the same time, instructions are sent to load device 17 concerning generated electrical power for warm-up Pw. As a result, load device 17 draws electrical power that corresponds to generated electrical power for warm-up Pw.

In step S30, controller 20 determines whether the prescribed warm-up completion conditions have been met. Here, the prescribed warm-up completion conditions that may be adopted include the temperature of fuel cell stack 2, the voltage of fuel cell stack 2 corresponding to generated electrical power for warm-up Pw, and so on. If in step S30 the warm-up completion conditions have not been met, process control returns to step S28, and the warm-up power generation is continued. On the other hand, if in step S30 the warm-up completion conditions have been met, process control goes to the normal power generation, and start-up of the fuel cell system comes to an end.

The following explanation will now be given regarding how the various control maps shown in FIGS. 7, 8, 9 are determined.

The map shown in FIG. 7 illustrates an example of the relationship between temperature Ts at shutting down of power generation and residual water volume Wr. Under the operating conditions in the various temperature regions assumed for the case when the fuel cell stack is carried onboard the vehicle, operation is performed until a sufficiently steady state (e.g., 15 min or longer is reached). Then, the residual water volume in the cell is measured by any of various methods. For example, empirical methods may be adopted, such as measurement of the weight of the stack after shutting down of power generation, measurement of the cell resistance, and so on. However, the inventors of the present invention found that the most effective method is to determine the residual water volume from the latent heat of evaporation. In this method, plural thermocouples are arranged in the cell, and, after shutting down of power generation, dry gas (or dewatered gas) is used to execute purging. As a result, due to cooling by the latent heat using evaporation of water content inside the cell, the temperature of the cell falls.

When all of the water content in the cell is evaporated, the temperature stops falling, and converges to a certain value. From the difference between the temperature when the purge is started and the final temperature, the evaporated water volume, that is, the water volume left in the cell, can be determined. By plotting the relationship between the residual water volume determined in this way and the temperature of the fuel cell stack immediately before shutting down, it is possible to determine the control map shown in FIG. 7.

The maps shown in FIGS. 8(a) and 8(b) illustrate an example of the relationship between absorbable water volume Wa at start-up below 0° C. and residual water volume Wr. For the unit cell with a sufficiently high thermal capacity, by the means of purging using gases with varied relative humidity for a long time, the residual water volume in the cell is set. The residual water volume in the cell is determined from the weight and resistance, and so on, when long time purge is performed using a gas preset at one of different relative humidity. Then, the water is cooled to the temperature (e.g., −20° C.) corresponding to the preset residual water volume, and power generation is performed. In the present case, for a time corresponding to the residual water volume, that is, for the time when MEA can absorb the generated water, the cell continues power generation.

When the generated water volume exceeds the absorbable water volume, gas feeding is hindered, and the cell voltage falls drastically, or the power generation is shut down. From the power generation time and the generated electrical energy, the generated water volume is determined, and this volume is taken as the water volume that can be absorbed by the MEA. For several different residual water quantities, experiments are performed, and the data of the water volume that can be absorbed by the MEA are plotted, and the maps shown in FIGS. 8A and 8B can be determined. Also, the relationship between absorbable water volume Wa and residual water volume Wr is due to the power generation temperature (−20° C. in the aforementioned example). As a result, at several different temperatures (e.g., −30° C., −20° C., −10° C.), the experiment is performed to determine the relationship at each temperature. At temperatures between them, these relationships can be determined by interpolation.

The map shown in FIG. 9 illustrates an example of the relationship between absorbable water volume Wa and generated electrical power for warm-up Pw. That is, the map of FIG. 9 shows the relationship between the water volume that can be absorbed by the MEA and the generated electrical power for warm-up in case of start-up below 0° C. When the generated electrical power for warm-up is lower, there is a tendency for the generated water to be absorbed on the membrane side, and, when the generated electrical power for warm-up is higher, there is a tendency for the generated water to seep out to the catalyst layer. When the generated water seeps out to the catalyst layer, diffusion of oxygen is hindered, the cell voltage falls, and deterioration takes place, which should be prevented. Consequently, in order to prevent the shutting down of power generation, it is necessary to set the generated electrical power for warm-up such that no generated water seeps out to the catalyst layer.

When the residual water volume left inside the cell (MEA) is larger, the generated electrical power for warm-up is lower, and warm-up power generation is performed such that the generated water that stays in the generated water retention area is small. On the other hand, when the residual water volume in the cell is smaller, it is possible to perform warm-up power generation such that the generated electrical power for warm-up is increased and the generated heat rises, and the time for start-up below 0° C. becomes shorter. The map shown in FIG. 9 may be determined by performing experiments for start-up below 0° C. of fuel cell stacks having different residual water volumes by changing the generated electrical power for warm-up to several different values, and the conditions under which it is possible to prevent the dropping of the cell voltage and deterioration, so that the shutting down of power generation can be avoided and the highest generated electrical power for warm-up that can be realized is determined experimentally.

FIGS. 11(a) and 11(b) illustrate the overall relationship when generated electrical power for warm-up Pw is determined from temperature Ts of the fuel cell stack at the last shutting down cycle. FIG. 11(a) corresponds to FIG. 7, FIG. 11(b) corresponds to FIG. 8(a), and FIG. 11(c) corresponds to FIG. 9. Consequently, it is possible to have a lower generated electrical power for warm-up when the temperature of the fuel cell stack at the last shutting down cycle is lower.

The first embodiment explained above contains the following exemplary parts: a temperature sensor that measures the temperature of the fuel cell stack, and a controller that estimates the residual water volume inside the fuel cell stack on the basis of the temperature at shutting down of power generation. More particularly, the higher the temperature, the lower the estimated residual water volume. Consequently, it is possible to estimate the residual water volume by using a simple constitution. As a result, it is possible to estimate the residual water volume without deterioration of the volumetric efficiency.

The first embodiment can also perform the following steps: a step in which the temperature of the fuel cell stack when power generation is shut down is measured, and a step in which power generation is performed for the fuel cell stack on the basis of the temperature when the fuel cell system is started. More particularly, the lower the temperature at shutting down, the lower the generated electrical power for warm-up of the fuel cell stack. As a result, it is possible to realize the effect that the warm-up operation can be completed in a shorter time without shutting down the warm-up power generation due to flooding or freezing of the generated water during warm-up power generation. On the other hand, when the temperature at the last shutting down cycle is higher, the residual water volume in the cell is smaller, so that the generated electrical power for warm-up at start-up below 0° C. does not fall. Consequently, the start time does not become longer.

In the following, an explanation will be given regarding a modified example of the first embodiment. In the first embodiment 1 shown in the flow charts of FIGS. 2 and 3, when the operation of the fuel cell system is shut down, temperature Ts of the fuel cell stack is measured and stored, and, in the next start cycle, the stored temperature Ts is read according to this constitution. When the operation is shut down, however, the computation of residual water volume Wr from temperature Ts, of absorbable water volume Wa from residual water volume Wr, and of generated electrical power for warm-up Pw from absorbable water volume Wa can be performed at any stage, and the intermediate results of said residual water volume Wr, absorbable water volume Wa, or generated electrical power for warm-up Pw can be stored in the nonvolatile memory in controller 20. Also, when the fuel cell system is started, changes may be made to use said residual water volume Wr, absorbable water volume W, or generated electrical power for warm-up Pw stored as intermediate results in the nonvolatile memory. In the present case, there is no essential change from the first embodiment.

Second Embodiment

In the following, an explanation will be given regarding control in the second embodiment of the fuel cell system of the present invention. The second embodiment differs from the first embodiment in that temperature Tn of the fuel cell stack at start-up is taken as reference in the second embodiment. Otherwise, the process for shutting down the operation of fuel cell system 1 is the same as that in the first embodiment shown in FIG. 2.

Figure 4:
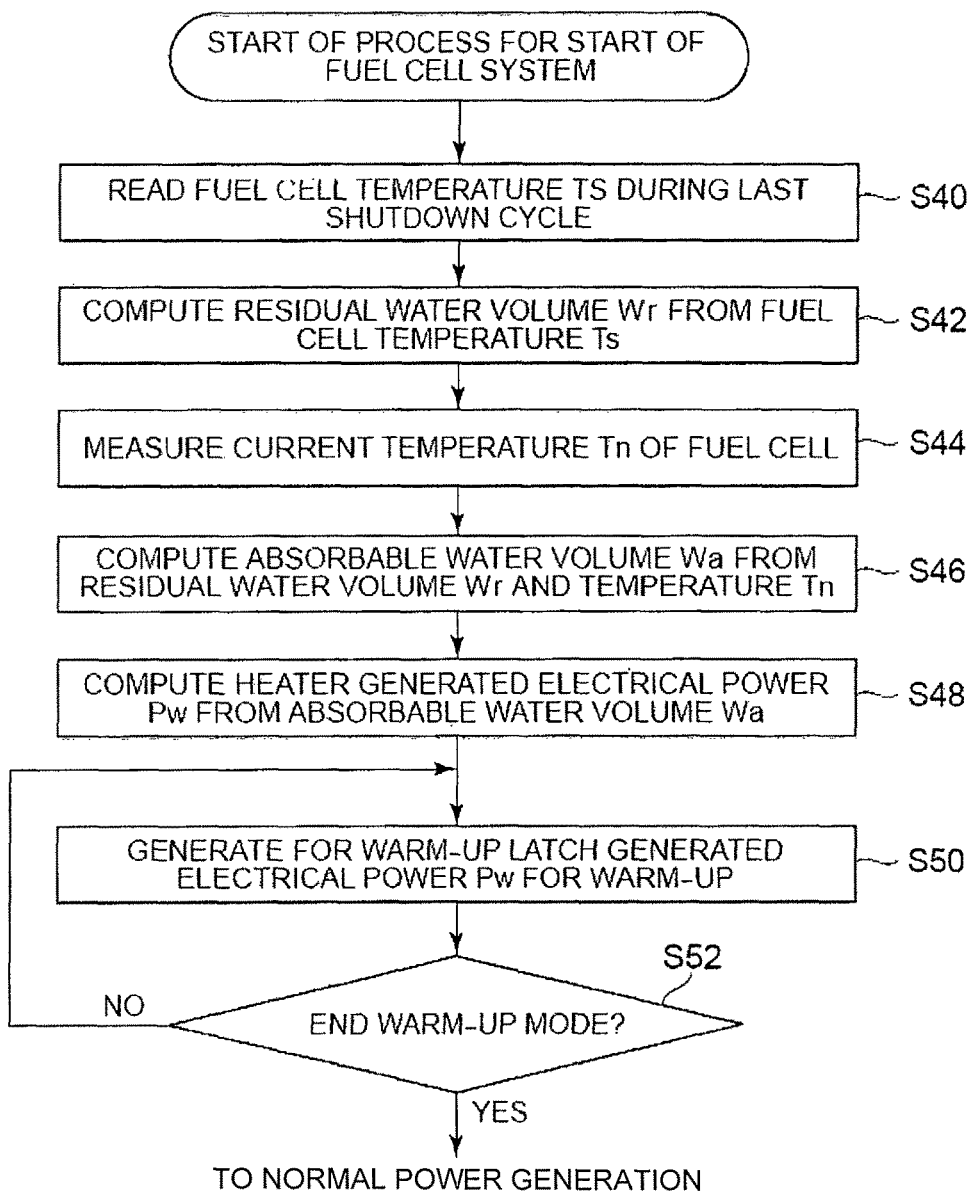
FIG. 4 is a flow chart illustrating an example of the process for starting up the fuel cell system in the second embodiment.

FIG. 4 is a flow chart illustrating an example of the process for start-up at sub-freezing temperatures of fuel cell system 1 in the second embodiment. When a request to start fuel cell system 1 is received, such as when the on/off key switch for controlling the fuel cell system is switched from off to on, the operation of the process to start the fuel cell system shown in FIG. 4 is started. First, in step S40, controller 20 reads fuel cell temperature Ts at the last shutting down cycle from the nonvolatile memory. Then, in step S42, controller 20 computes residual water volume Wr left in MEA of fuel cell stack 2 from temperature Ts. In this computing operation, as shown in FIG. 7, the control map indicating the relationship between temperature Ts and residual water volume Wr is used.

In step S44, controller 20 measures the current temperature of the fuel cell stack, in other words, temperature Tn of fuel cell stack 2 at start-up. In order to get temperature Tn, one may use temperature sensor 18 set in fuel cell stack 2 shown in FIG. 1. Also, when no temperature sensor is set in fuel cell stack 2, one may use temperature sensor 19 set at the outlet of the coolant of fuel cell stack 2 to perform the measurement.

Then, in step S46, from residual water volume Wr and start temperature Tn, controller 20 refers to the control map that shows the relationship of residual water volume Wr and start temperature Tn to absorbable water volume Wa as shown in FIG. 8(b) to compute water volume Wa that can be absorbed by the MEA. In step S48, from absorbable water volume Wa, controller 20 refers to the control map illustrating the relationship between absorbable water volume Wa and generated electrical power for warm-up Pw as shown in FIG. 9 to compute generated electrical power for warm-up. In this way, generated electrical power for warm-up Pw is calculated. Then, in step S50, controller 20 controls the supply of hydrogen and air corresponding to generated electrical power for warm-up Pw. At the same time, the controller sends instructions to load device 17 concerning generated electrical power for warm-up Pw. As a result, load device 17 draws the electrical power at generated electrical power for warm-up Pw.

In step S52, controller 20 determines whether the prescribed warm-up completion conditions have been met. Examples of the prescribed warm-up completion conditions that may be adopted include the temperature of fuel cell stack 2, the voltage of fuel cell stack 2 corresponding to generated electrical power for warm-up Pw, and so on. If the warm-up completion conditions have not been met in the judgment performed in step S52, process control returns to step S50, and the warm-up power generation is continued. On the other hand, if the judgment in step S52 indicates that the warm-up completion conditions have been met, process control returns to normal power generation, and the start-up of the fuel cell system comes to an end.

Figure 12A:
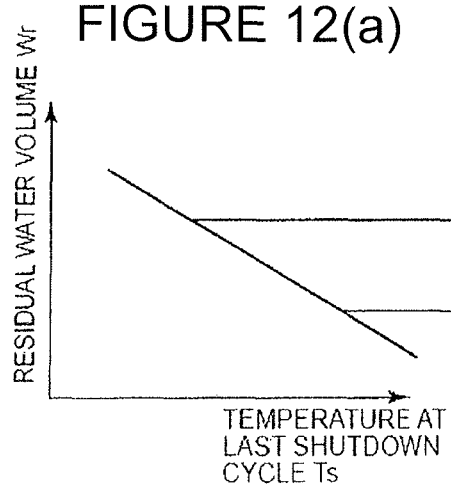
FIGS. 12(a)-(c) are diagrams illustrating an example of the process of determination of generated electrical power for warm-up Pw from fuel cell temperature Ts at the last shutting down cycle in the second embodiment.
Figure 12B:
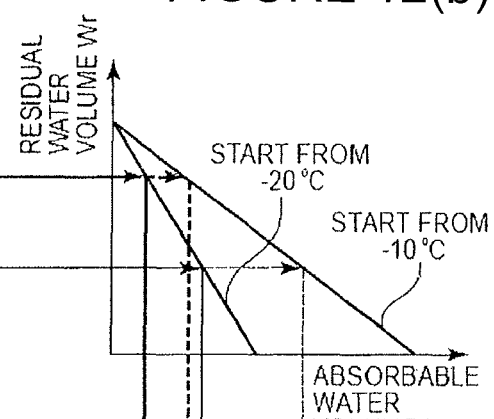
Figure 12C:
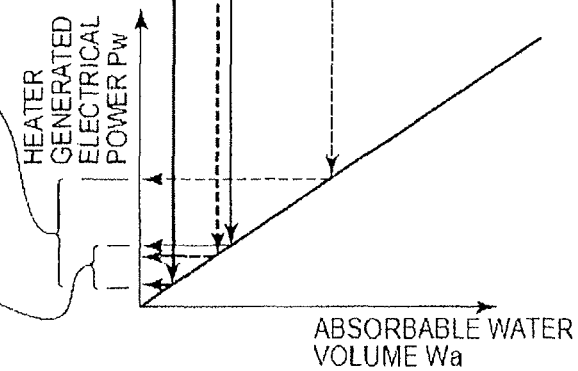

FIGS. 12(a)-12(c) illustrate an example of the overall constitution when generated electrical power for warm-up Pw is determined from fuel cell temperature Ts at the last shutting down cycle in the present embodiment. FIG. 12(a) corresponds to FIG. 7, FIG. 12(b) corresponds to FIG. 8(b), and FIG. 12(c) corresponds to FIG. 9.

As shown in the map of FIG. 8(b), the water volume that can be absorbed by the MEA corresponding to the residual water volume of MEA depends on fuel cell temperature Tn at start-up. According to this constitution, for the same residual water volume Wr, the lower the temperature Tn at start-up, the smaller the absorbable water volume Wa. However, when the start temperature exceeds a prescribed level, regardless of the residual water volume, the absorbable water volume is constant or substantially constant. Consequently, when the start-up temperature is below a prescribed level, as shown in FIGS. 12(a)-12(c), the higher the temperature of the fuel cell stack at start-up (when it moves from −20° C. towards −10° C. as shown in the figure), the greater the final proportion of change in the generated electrical power for warm-up. Also, the higher the temperature of the fuel cell stack at start-up, the higher the maximum generated electrical power for warm-up.

According the to second embodiment explained above, the lower the temperature of the fuel cell stack at the last shutting down cycle, the lower the generated electrical power for warm-up at start-up below 0° C., and the lower the temperature of the fuel cell stack at start-up below 0° C., the greater the proportion of decrease in the generated electrical power for warm-up. Consequently, it is possible to increase the generated electrical power for warm-up as much as possible corresponding to the level of the temperature of the fuel cell at start-up below 0° C., so that the start time can be further shortened.

Third Embodiment

In the following, an explanation will be given regarding the control operation in third embodiment of the fuel cell system of the present invention. The third embodiment differs from the second embodiment in that the residual water volume in the fuel cell stack is estimated on the basis of the total generated electrical energy during the period from the last cycle of start-up to shutting down of power generation and on the basis of the temperature of the fuel cell stack when power generation is shut down. Otherwise, the process for shutting down the operation of fuel cell system 1 is identical to the first embodiment shown in FIG. 2.

Figure 5:
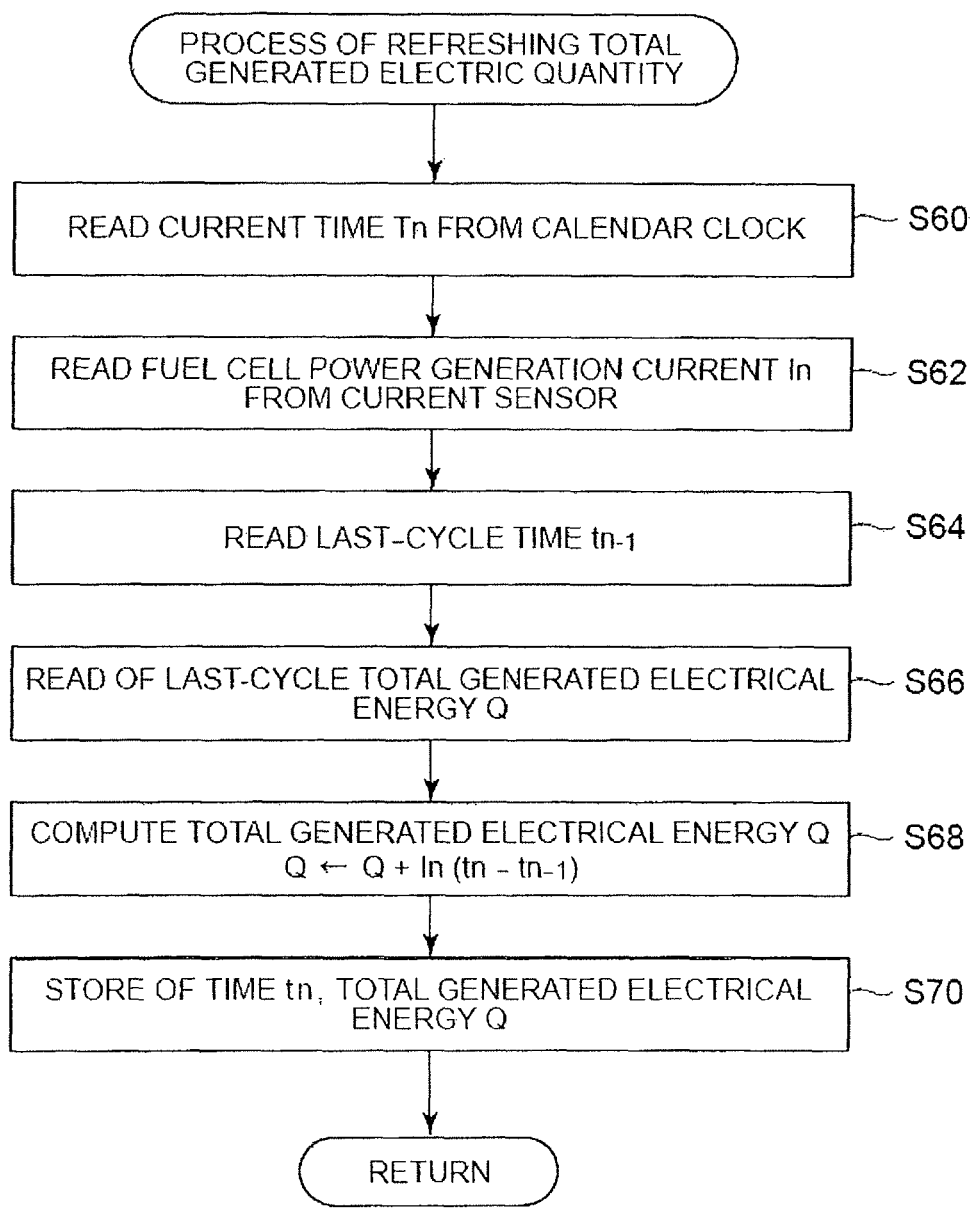
FIG. 5 is a flow chart illustrating an example of the process for refreshing the total generated electrical energy of the fuel cell stack in the third embodiment.

In the following, an explanation will be given regarding the control operation in the third embodiment with reference to the flow charts shown in FIGS. 5 and 6. FIG. 5 is a diagram illustrating the subroutine of the refresh process of the total generated electrical energy repeatedly called from the main routine of controller 20 during operation of the fuel cell system. This subroutine may be called once each prescribed time. Also, when there is a margin in the process of controller 20, the process may also be performed by calling it out as needed.

When the subroutine shown in FIG. 5 is called, first, in step S60, the current time tn is read from the calendar clock of controller 20. Usually, the calendar clock is equipped inside the controller; it is a calendar clock that indicates the current day and time.

Then, in step S62, controller 20 reads generated current In of fuel cell stack 2 measured by current sensor 16. In step S64, controller 20 reads time $t_{n-1}$ when the total generated electrical energy of the last cycle is refreshed. In step S66, the last cycle refreshed total generated electrical energy Q is read from the nonvolatile memory. Then, in S68, controller 20 computes Q+In $(t_n-t_{n-1})$ to get the refreshed total generated electrical energy Q. In S70, controller 20 stores time $t_n$, and at the same time, stores refreshed total generated electrical energy Q in the nonvolatile memory, and process control then returns to the main routine.

Figure 6:
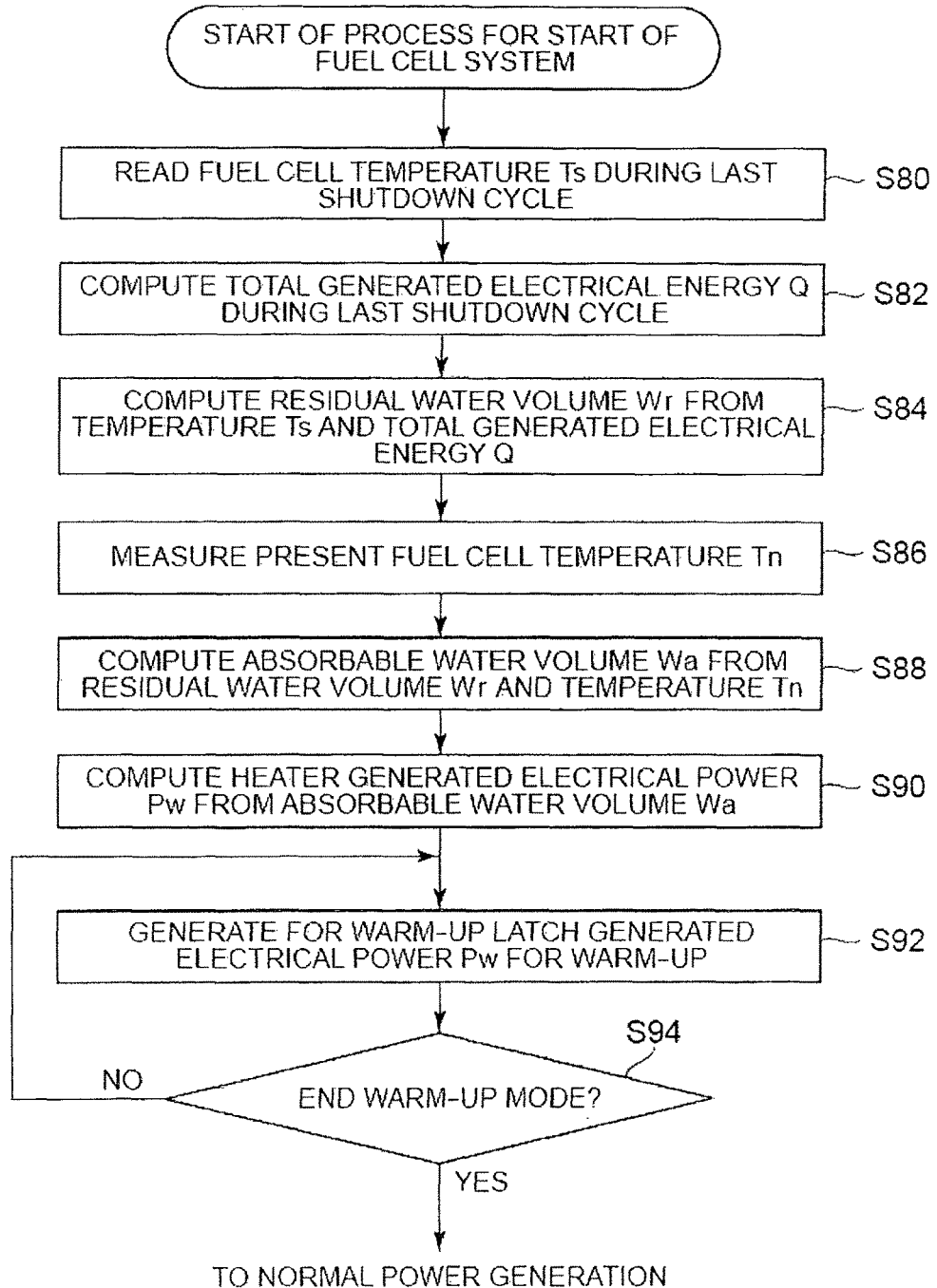
FIG. 6 is a flow chart illustrating an example of the process for starting up the fuel cell system in the third embodiment.
Figure 10:
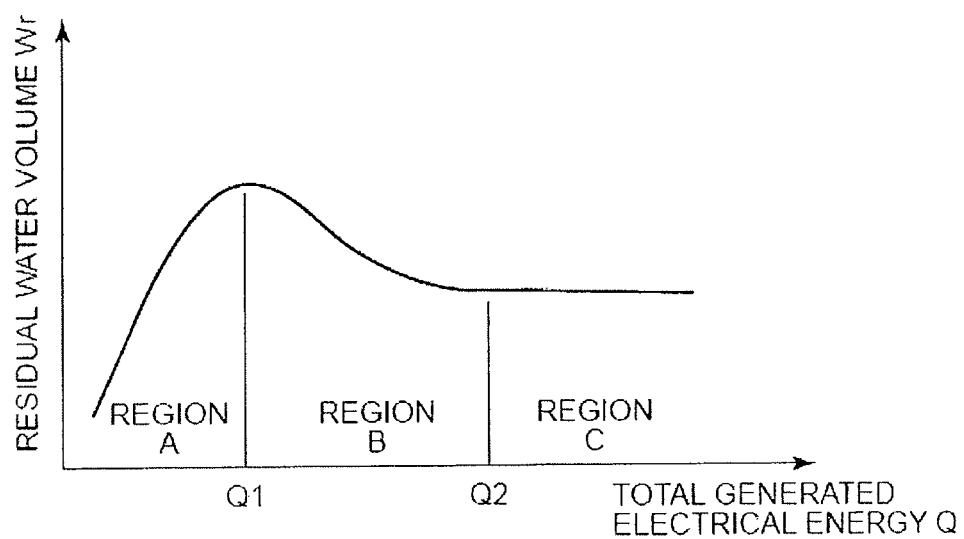
FIG. 10 is a diagram illustrating an example of the control map showing the relationship between total generated electrical energy Q and residual water volume Wr in the third embodiment.

FIG. 6 is a flow chart illustrating the process for start-up below 0° C. of fuel cell system 1 in the third embodiment. When a request to start of fuel cell system 1 is received, such as switching of the on/off key switch that controls the fuel cell system from on to off, the process for starting of the fuel cell system shown in FIG. 6 is started. First, in step S80, controller 20 reads fuel cell temperature Ts at the last shutting down cycle is read from the nonvolatile memory. Then, in step S82, controller 20 reads total generated electrical energy Q during the period from the last start to shutting down cycle from the nonvolatile memory. In step S84, controller 20 computes residual water volume Wr left in the MEA of fuel cell stack 2 from temperature Ts and total generated electrical energy Q. In this computation, the control map indicating the relationship between total generated electrical energy Q and residual water volume Wr as shown in FIG. 10 prepared by storing the data at plural temperatures (such as at intervals of 10° C. in the range of 60° C. to 90° C.). The value corresponding to temperature Ts [between the 10° C.-interval points of the map] is determined by the means of interpolation.

In step S86, controller 20 measures the current temperature of the fuel cell stack, in other words, temperature Tn of fuel cell stack 2 at start-up. To determine temperature Tn, one may use temperature sensor 18 arranged in fuel cell stack 2 as shown in FIG. 1. Also, when no temperature sensor is set in fuel cell stack 2, one may use temperature sensor 19 set at the outlet of the coolant of fuel cell stack 2.

In step S88, controller 20 computes water volume Wa that can be absorbed by the MEA from residual water volume Wr and temperature Tn at start-up by referring to the control map that indicates the relationship of residual water volume Wr and start temperature Tn to absorbable water volume Wa as shown in FIG. 8(b). Then, in step S90, controller 20 computes generated electrical power for warm-up Pw from absorbable water volume Wa by referring to the control map that indicates the relationship between absorbable water volume Wa and generated electrical power for warm-up Pw as shown in FIG. 9. Then, in step S92, controller 20 controls the supply of hydrogen and air that corresponds to generated electrical power for warm-up Pw. At the same time, it sends instructions to load device 17 concerning generated electrical power for warm-up Pw. As a result, load device 17 draws the electrical power as generated electrical power for warm-up Pw.

In step S94, controller 20 determines whether the prescribed warm-up completion conditions have been met. Here, the prescribed warm-up completion conditions that may be adopted include the temperature of fuel cell stack 2, the voltage of fuel cell stack 2 corresponding to generated electrical power for warm-up Pw, and so on. In the judgment of step S94, if the warm-up completion conditions have not been met, process control returns to step S92, and the warm-up power generation is continued. On the other hand, if the judgment in step S94 indicates that the warm-up completion condition has been met, process control returns to the normal power generation, and the start-up of the fuel cell system comes to an end.

The following explanation will be given regarding the scheme for determining the control map shown in FIG. 10. The total generated electrical energy Q and the residual water volume Wr inside the cell can have the relationship shown in FIG. 10. This relationship can be experimentally determined for different power generation times of, for example, 6-10 hours under the conditions in the various temperature regions assumed for the case when the fuel cell stack is carried in a vehicle. The method used to determine the residual water volume on the ordinate from the shutting down of power generation is the same as was described above, and it will not be explained in detail again.

As shown in region A of FIG. 10, the residual water volume that remains inside the cell increases with the total generated electrical energy from the start of power generation to the total generation electrical energy Q1. Then, in region B, from the total generated electrical energy Q1 to Q2, there is a tendency for the residual water volume to decrease as the total generated electrical energy increases. Also, in region C, where the total generated electrical energy exceeds Q2, the residual water volume becomes constant or substantially constant regardless of the total generated electrical energy. Here, for the generated electrical energy in region A and region B, there is a significant variation in the properties of the materials of MEA and gas diffusion layer (GDL). Consequently, it is necessary to experimentally determine the map beforehand by the means of the MEA and GDL used in an actual product.

By the means of the control map shown in FIG. 10, in region B of the total generated electrical energy, the greater the total generated electrical energy, the higher the generated electrical power for warm-up. In region A, the greater the total generated electrical energy, the lower the generated electrical power for warm-up. As a result, it is possible to perform an optimum start below 0° C. when each cell contains water.

Also, as shown in FIG. 8(b), assume that at a sub-freezing temperature, e.g., −5° C., the characteristics are such that the water volume that can be absorbed by the MEA is constant or substantially constant, regardless of the residual water volume. Consequently, when the typical temperature of the fuel cell stack at start-up exceeds a prescribed level, the generated electrical power for warm-up is constant or substantially constant, regardless of the temperature of the fuel cell when the power generation is shut down and the total generated electrical energy during the period from the last power generation cycle from start-up to shutting down, and it is possible to execute efficient heater operation at start-up below 0° C.

FIGS. 14(a)-(c) illustrate the overall constitution until generated electrical power for warm-up Pw is determined when total generated electrical energy Q is in region A until Q1 in this embodiment. FIG. 14(a) corresponds to FIG. 10, FIG. 14(b) corresponds to FIG. 8(b), and FIG. 14(c) corresponds to FIG. 9. In region A, where the residual water volume in the cell rises when the total generated electrical energy is increased, the greater the total generated electrical energy, the lower the generated electrical power for warm-up. Consequently, the residual water volume is predicted not only from the temperature of the stack during the last power generation cycle, but also from the total generated electrical energy, so that by adjusting the generated electrical power for warm-up, it is possible to improve the start-up performance below 0° C.

FIGS. 13(a)-(c) illustrate the overall constitution until the determination of generated electrical power for warm-up Pw when total generated electrical energy Q is in region B from Q1 to Q2 in this embodiment. FIG. 13(a) corresponds to FIG. 10, FIG. 13(b) corresponds to FIG. 8(b), and FIG. 13(c) corresponds to FIG. 9. In region B, where the residual water volume in the cell decreases when the total generated electrical energy increases, the greater the total generated electrical energy, the higher the generated electrical power for warm-up. Consequently, the residual water volume can predicted not only from the temperature of the fuel cell at the last shutdown cycle of power generation, but also from the total generated electrical energy, and, by adjusting the generated electrical power for warm-up, it is possible to further improve the start-up performance below 0° C.

FIGS. 15(a)-(c) are diagrams illustrating the overall constitution until the determination of generated electrical power for warm-up Pw when the start-up temperature of the fuel cell is −5° C. FIG. 15(a) corresponds to FIG. 10, FIG. 15(b) corresponds to FIG. 8(b), and FIG. 15(c) corresponds to FIG. 9. When the start-up temperature of the fuel cell is over −5° C., the water volume that can be absorbed by the MEA is taken as constant or substantially constant, and it is possible to consider the generated electrical power for warm-up at start-up as constant or substantially constant, regardless of the temperature of the fuel cell at the last shutdown cycle of power generation and the total generated electrical energy. Consequently, regardless of the residual water volume in the cell, it is possible to execute the warm-up operation at start-up below 0° C. efficiently in the region where start-up below 0° C. is usually performed.

In the embodiments discussed above, the residual water volume inside the fuel cell stack is determined on the basis of the temperature of the fuel cell stack when power generation is shut down and the total generated electrical energy generated during the period from power generation start-up to shutting down. Then, from the residual water volume, the water volume that can be absorbed by the MEA at start-up is determined, and the generated electrical power for warm-up is determined from the absorbable water volume. However, the following scheme may be adopted: the relationship between the residual water volume in the fuel cell stack and the generated electrical power for warm-up is stored as a map which was experimentally determined beforehand. The generated electrical power for warm-up is determined from the map. In this way, the same effect can be realized. In addition, the following scheme may be adopted: the process used to determine the residual water volume can also be omitted. Instead, a map indicating the relationship of the temperature of the fuel cell stack immediately before shutting down and the total generated electrical energy to the generated electrical power for warm-up is prepared, and instead of determining the residual water volume, the generated electrical power for warm-up is directly determined from the temperature of the fuel cell stack and the total generated electrical energy.

Modified Example

In the embodiments described above, residual water volume Wr is estimated to control the start-up process. However, one may also adopt a scheme in which the result of estimating residual water volume Wr is also used for the shutting down process.

More particularly, before the operation of the fuel cell system is shut down, water/air purge process control device 25 is used to perform a water/air purge process to remove water content from the interior of the fuel cell stack. For the sake of convenience to the vehicle driver, a shorter time is preferred to perform the water/air purge process. However, if the time is too short, water is purged insufficiently, gas diffusion is hindered, so that it becomes impossible to perform a start-up below 0° C. On the other hand, if water/air purge process is performed for too long a time, the solid-state polymer membrane becomes too dry. Consequently, the proton conductivity at start-up below 0° C. falls, resulting in insufficient output power at start-up below 0° C., which is undesirable. Thus, in the water/air purge process before shutting down of operation, it is important to ensure that the water volume that remains inside the fuel cell stack, that is, the residual water volume, is estimated or detected, and the water/air purge process is performed to produce the optimum wetness.

Figure 16:
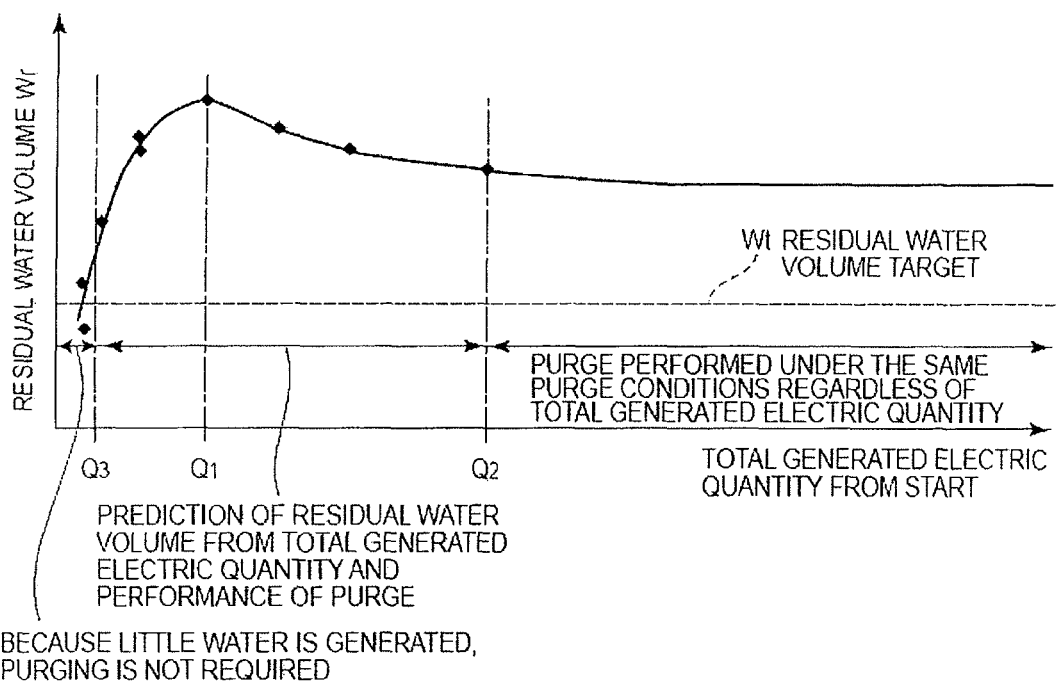
FIG. 16 is a diagram illustrating an example of the map for estimating the residual water volume from the total generated electrical energy during the period from start-up of the fuel cell system to shutting down of power generation in the modified example.

The following explanation will be given regarding a method of estimating the residual water volume in the fuel cell stack from the total generated electrical energy from start-up with reference to FIG. 16. When total generated electrical energy is less than the third prescribed value Q3 such that the fuel cell system is started and is then shut down after a short time, because the generated water volume is small, the water/air purge process before shutting down of the operation is not executed.

Also, when the total generated electrical energy exceeds the third prescribed value Q3 and is below the second prescribed value Q2, the water/air purge process is performed corresponding to the total generated electrical energy on the basis of the map of the residual water volume and the total generated electrical energy from start-up that has been experimentally verified beforehand. More particularly, the residual water volume is estimated from the total generated electrical energy, and the water/air purge process is performed by feeding air to the cathode and hydrogen to the anode until the residual water volume reaches the target residual water volume Wt.

When the value of the total generated electrical energy is smaller than the first prescribed value Q1 that becomes the maximum residual water volume experimentally determined beforehand, the residual water volume is estimated to be larger corresponding to larger total generated electrical energy. Consequently, as the total generated electrical energy increases, the purged water volume increases. On the other hand, when said total generated electrical energy exceeds the first prescribed value Q1, as the total generated electrical energy increases, the estimated residual water volume decreases. When the total generated electrical energy rises, the purged water volume decreases.

Also, the purged water volume during the water/air purge process depends on the temperature of the fuel cell stack, flow rate and pressure loss before shutting down the operation. Consequently, the temperature of the fuel cell stack is estimated or detected, and with the relative humidity (RH) at the outlet of the cathode of the fuel cell stack taken as 100%, the purged water volume is computed. The water/air purge time and the air flow rate during the water/air purge process are then determined on the basis of the target residual water volume.

Also, when the total generated electrical energy after start-up exceeds the second prescribed value Q2, the residual water volume that remains in the fuel cell stack becomes the prescribed residual water volume depending on the temperature of the fuel cell stack, the operating pressure, the dew point temperature at the inlet of the cathode, the dew point temperature at the inlet of the anode, the anode gas flow rate, and the cathode gas flow rate.

However, once the temperature of the fuel cell stack is determined, the operating pressure, the dew point temperature at the cathode inlet, the dew point temperature at the anode inlet, the flow rate of the anode gas, and the flow rate of the cathode gas are all determined. The reason for this is that the operating pressure, the anode gas flow rate and the cathode gas flow rate are determined by the means of the operation map. Also, the dew point temperature at the anode inlet and the dew point temperature at the cathode inlet act as a passive system for the system that adopts a circulating system at the anode, and the cathode system has a water recovery device (WRD). Consequently, the residual water volume inside the fuel cell stack is constant or substantially constant, and independent of the total generated electrical energy inside the fuel cell stack, it can be estimated only on the basis of the temperature of the fuel cell stack. As a result, it is possible to perform the water/air purge process as a constant or substantially constant process independently of the total generated electrical energy.

Figure 17:
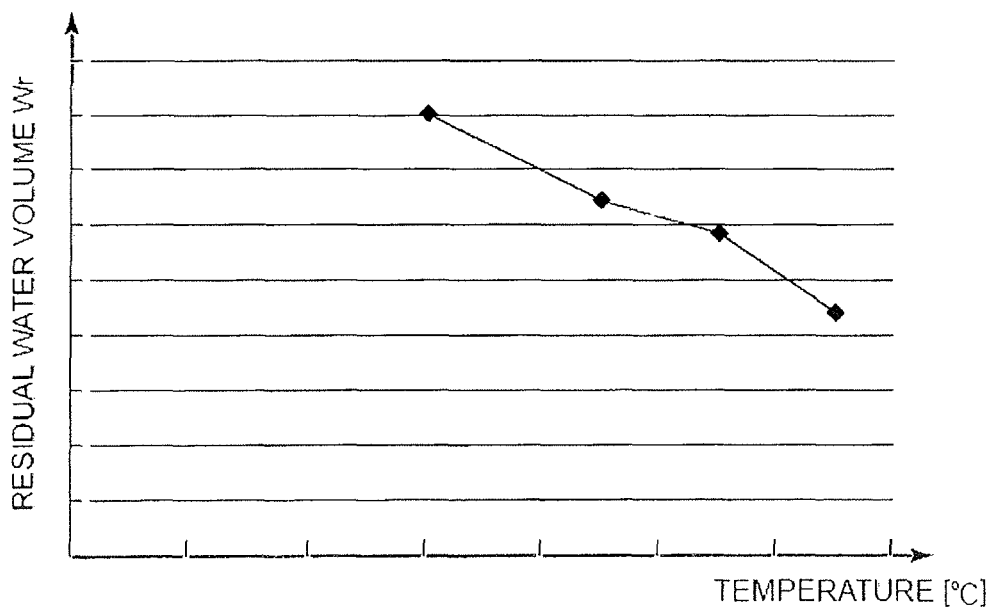
FIG. 17 is a diagram illustrating an example of the relationship between the temperature of the fuel cell stack and the residual water volume.

The following explanation will be given regarding the relationship between the temperature of the fuel cell stack and the residual water volume with reference to FIG. 17. As shown in FIG. 17, the higher the temperature of the fuel cell stack, the smaller the residual water volume inside the MEA. This occurs because when the load and the flow rate of the feed gas are the same, the generated water volume is constant or substantially constant, but the higher the temperature, the higher the saturated water vapor pressure, and the greater the water content that escapes from the fuel cell stack when the same volume of gas is fed.

In the following, an explanation will be given regarding the operation of controller 20 in the modified example with reference to the flow chart shown in FIG. 18. Also, in the modified example, as a value related to the total generated electrical energy as the sum of the electrical energy generated by fuel cell stack 2 from start-up of the fuel cell system, the total generated electric charge (in units of Coulombs: C) by fuel cell stack 2 is used.

FIG. 18 is a flow chart illustrating an example of the process for shutting down fuel cell system 1 in the modified example. When a request to start fuel cell system 1 is received, such as switching the on/off key switch that controls the fuel cell system from on to off, the operation of the process for shutting down the fuel cell system 1 shown in FIG. 18 is started. First, in step S100, controller 20 reads the measurement value obtained by temperature sensor 18 (or 19) as fuel cell temperature Ts.

Then, in step S101, controller 20 reads total generated electrical energy Q. Then, in 102, controller 20 determines whether said total generated electrical energy Q is smaller than the prescribed value Q3 (the third prescribed value) as the value for determining whether the water/air purge process is to be performed. If the judgment made in S102 indicates that total generated electrical energy Q is smaller than Q3, residual water volume Wr decreases and the water/air purge process is not needed, and process control goes to step S107 in order to shut down the gas supply and the cooling water pump.

If the determination in step S102 indicates that total generated electrical energy Q exceeds Q3, residual water volume Wr will be larger, so that a water/air purge process is necessary. Consequently, process control goes to step S103. In step S103, controller 20 determines whether total generated electrical energy Q, while being larger than the third prescribed value Q3, is smaller than the second prescribed value Q2, or smaller than the second prescribed value Q2 and the first prescribed value Q1.

In steps S102 and S103, prescribed value Q3 for determining total generated electrical energy Q is experimentally determined. More particularly, when the fuel cell system is started at sub-freezing temperatures, the minimum electrical power required by the fuel cell system (such as the electrical power required for warming up air compressor 10 and coolant pump 12 as auxiliary equipments of the fuel cell) is determined on the basis of the residual water volume that allows power generation in the warm-up power generation.

In step S103, the prescribed value Q2 for judgment of total generated electrical energy Q is experimentally determined. More particularly, experiments are performed to measure the weight of each of the fuel cell stacks after operation times at different total generated electric energies from start-up at different fuel cell stack temperatures. Then, the minimum total generated electrical energy is determined when the residual water volume becomes constant or substantially constant independently of the total generated electrical energy. This value is set as said prescribed value Q2.

If the result of the judgment in step S103 is yes, controller 20 goes to S104. In this step, residual water volume Wr left in the MEA of fuel cell stack 2 is estimated corresponding to fuel cell temperature Ts and total generated electrical energy Q from start-up. Process control then proceeds to step S106.

In the following, an explanation will be given in more detail regarding the method of estimating residual water volume Wr in step S104. In this estimation, the control map indicating the relationship between total generated electrical energy Q and residual water volume Wr as shown in FIG. 16 prepared by storing the data at plural temperatures (such as at intervals of 5° C. over the range of 30° C. to 80° C.). The value corresponding to temperature Ts between the 5° C.-interval points of the control map is determined by the means of interpolation.

If the determination in step S103 is no, the process performed by controller 20 proceeds to step S105. In this step, the residual water volume is estimated by referring to the control map shown in FIG. 17 that indicates the relationship between fuel cell temperature Ts and residual water volume Wr. Process control then proceeds to step S106.

In step S106, a water/air purge process is performed for fuel cell stack 2 until residual water volume Wr estimated for the fuel cell stack is reduced to the prescribed target residual water volume Wt. The target residual water volume Wt is experimentally determined. More specifically, although the start-up temperature of the fuel cell stack is below freezing, if gas feeding is not hindered due to flooding or freezing of the generated water during warm-up power generation, the residual water volume that remains in the fuel cell stack is determined. In order to determine said water volume, experiments for starting the fuel cell system at sub-freezing are performed by changing the residual water volume stepwise.

The following explanation will be given in more detail regarding the water/air purge process in step S106. First, controller 20 stops retrieval of the generated current from fuel cell stack 2. Then, controller 20 feeds air directly from air compressor 10 to cathode 4 (without a humidity exchanger, etc.). Also, controller 20 continues the operation of hydrogen circulation blower 9, while it closes hydrogen pressure adjustment valve 6 to stop the supply of fresh hydrogen.

Then, unhumidified air that is fed to cathode 4 to perform the water/air purge process. The purged water volume from fuel cell stack 2 in the water/air purge process is estimated as follows. First, the saturated water vapor pressure is computed from fuel cell temperature Ts. Then, with the relative humidity (RH) at the cathode outlet taken as 100%, the purged water volume per unit time is computed from the cathode pressure detected by a cathode pressure sensor (not shown in the figure) and the cathode flow rate detected by a cathode flow rate sensor (not shown in the figure). The water/air purge process time and the air flow rate during the water/air purge process are determined so that target residual water volume Wt is reached. After the water/air purge process time, the residual water volume that remains in the fuel cell stack is reduced to target residual water volume Wt, and process control goes to step S107 to stop the water/air purge process.

In step S107, air compressor 10 and hydrogen circulation blower 9 are shut down, and the supply of gas to fuel cell stack 2 is stopped. Then, in step S108, coolant pump 12 is shut down, and the process of shutting down the fuel cell system comes to an end.

In this modified example, as a value related to the total generated electrical energy, the total quantity of generated charge is used. However, one may also use the total quantity of generated hydrogen, the total quantity of consumed hydrogen, and the total quantity of generated electricity.

As can be understood from the above, this modified example includes the following steps: a step in which the temperature of the fuel cell stack when power generation is shut down is measured, and a step in which the residual water that remains in the fuel cell is purged on the basis of the temperature when the fuel cell system is shut down. More particularly, water/air purge process control device 25 executes controls so that when the fuel cell system is shut down, the lower the temperature when gas permeable is shut down, the greater the purged water volume. Consequently, it is possible to perform the shutting down process (water/air purge process) on the basis of the residual water volume so that the residual water volume (target residual water volume) reaches a prescribed level.

Also, water/air purge process control device 25 executes controls so that when the total generated electrical energy storage device drops below a prescribed level, the higher the stored value, the greater the purged water volume, and when the stored value exceeds a prescribed level, the higher the storage value, the smaller the purged water volume. Consequently, it is possible to shut down the operation so that the MEA has optimum wetness.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A residual water purge control system for a fuel cell system having a fuel cell stack that generates electrical power by electrochemical reaction of fuel and oxidant, a residual water estimating apparatus, and a residual water purge control device, the residual water estimating apparatus comprising:
   a total generated electrical energy storage device that stores a value representing the total generated electrical energy of the fuel cell stack in the period from start-up to shutdown of power generation; and
   a controller that is programmed to estimate a residual water volume that can be absorbed by a membrane electrode assembly of the fuel cell stack from a first control map that indicates a relationship between the residual water volume and said stored value in said total generated electrical energy storage device;
   wherein when the stored value in said total generated electrical energy storage device is below a first prescribed level corresponding to a maximum of the residual water volume, said controller is programmed to estimate the residual water volume to be proportional to said stored value; and, when said stored value exceeds the first prescribed level, said controller is programmed to estimate the residual water volume to be inversely proportional to an increase in said stored value with respect to the first prescribed level; and
   wherein when said stored value exceeds a second prescribed level larger than the first prescribed level, said controller estimates the residual water volume to be substantially constant; and
   wherein the residual water purge control device is programmed to control a purging volume of the residual water purge control system based on the estimated residual water volume after the residual water has been estimated by the controller.

2. The residual water purge control system as claimed in claim 1, wherein the stored value is proportional to the total generated electrical energy.

3. The residual water purge control system as claimed in claim 1, wherein the stored value is selected from one of a total generated electric charge, a total quantity of generated hydrogen, a total quantity of consumed hydrogen, and a total quantity of the generated electricity.

4. The residual water purge control system as claimed in claim 1, wherein when the stored value in said total generated electrical energy storage device exceeds the first prescribed level but not the second prescribed level, said residual water purge control device is programmed to control a purging volume of the residual water purge control system to be decreased in accordance with an increase in the total generated electricity, and wherein when the stored value in said total generated electrical energy storage device exceeds the second prescribed level, said residual water purge control device is programmed to control the purging volume of the residual water purge control system to be constant.

* * * * *